(12) United States Patent
Chen

(10) Patent No.: US 7,083,177 B1
(45) Date of Patent: Aug. 1, 2006

(54) STEERING KNUCKLE STRUCTURE

(75) Inventor: Ting-Hsing Chen, Tainan Hsien (TW)

(73) Assignee: Far Great Plastics Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 11/103,524

(22) Filed: Apr. 12, 2005

(51) Int. Cl.
*B62M 1/00* (2006.01)

(52) U.S. Cl. .......................... 280/87.041; 280/87.021; 280/47.34; 403/131

(58) Field of Classification Search .......... 280/87.041, 280/87.042, 93.512, 47.34; 403/33, 43, 110, 403/115, 143, 159, 150
See application file for complete search history.

(56) References Cited

U.S. PATENT DOCUMENTS

| | | | | |
|---|---|---|---|---|
| 880,450 | A * | 2/1908 | Henvis ................ | 280/93.512 |
| 1,227,888 | A * | 5/1917 | Converse ............. | 280/87.041 |
| 1,568,412 | A * | 1/1926 | Parkes ................. | 280/87.041 |
| 3,210,103 | A * | 10/1965 | Montgomery et al. ...... | 403/115 |
| 3,851,979 | A * | 12/1974 | Becker ................ | 403/115 |
| 5,899,167 | A * | 5/1999 | Furman ................ | 403/143 |
| 5,947,493 | A * | 9/1999 | Pasin et al. ............. | 280/47.34 |
| 6,234,703 | B1 * | 5/2001 | Bieg et al. ............... | 403/115 |
| 6,244,605 | B1 * | 6/2001 | Liu ..................... | 280/87.041 |
| 6,390,483 | B1 * | 5/2002 | Hsu et al. .............. | 280/87.041 |
| 6,505,845 | B1 * | 1/2003 | Fong ................... | 280/87.041 |
| 6,511,083 | B1 * | 1/2003 | Tsai .................... | 280/87.041 |

* cited by examiner

*Primary Examiner*—Hau Phan
(74) *Attorney, Agent, or Firm*—Rosenberg, Klein & Lee

(57) ABSTRACT

A steering knuckle structure includes a front strut, a connecting device, and a sleeve. The front strut has a connecting pipe at the bottom. The connecting device comprises an upper section and a corresponding lower section. Both the upper section and the lower section comprise extending edges with holes thereon. The upper section further comprises a slot for the front strut to insert there through. The lower section is transversely secured on the middle portion of the sleeve for the connecting pipe of the front strut to seat thereon. The upper section and the lower section are secured together to wrap the connecting pipe therein, which enables the front strut to swing relative to the sleeve.

2 Claims, 4 Drawing Sheets

STEERING KNUCKLE STRUCTURE

BACKGROUND OF THE INVENTION

1. Field of the Invention

This invention relates to a steering knuckle structure, and more particularly to a steering knuckle for playing cars or scooters.

2. Description of the Prior Art

There are a number of playing cars on the market. As shown in FIG. 4, a conventional riding device disclosed in U.S. Pat. No. 6,520,517, comprises a steering column A inserted into a cylindrical member B. The steering column A is then connected at the end with a triangle axle member C having two front wheels D coupled at respective ends thereof. The cylindrical member B is coupled with a neck E extending from a deck F. The steering column A links the axle member C to turn.

The riding device includes the deck upon which a rider can be supported. Front and rear wheels provide independent steering upon tilting or banking of the deck in use. The steering column is connected to the front wheels to provide additional steering control. The steering column tilts in unison with the deck and provides no steering effect upon deck pivoting alone.

Thus, the rider turns the handle to links the front wheels to turn simultaneously, and the deck also tilts towards the same side.

However, the weight of the handle falls onto the axle member, which may break the pivoting point easily and cause an accident.

SUMMARY OF THE INVENTION

It is the primary object of the present invention to provide a steering knuckle structure, which is safe and stable to a user.

It is another object of the present invention to provide a steering knuckle structure, which has a longer service life.

It is a further object of the present invention to provide a steering knuckle structure, which is easy to operate and to maintain.

DETAILED DESCRIPTION OF THE PREFERRED EMBODIMENT

Figure 1:
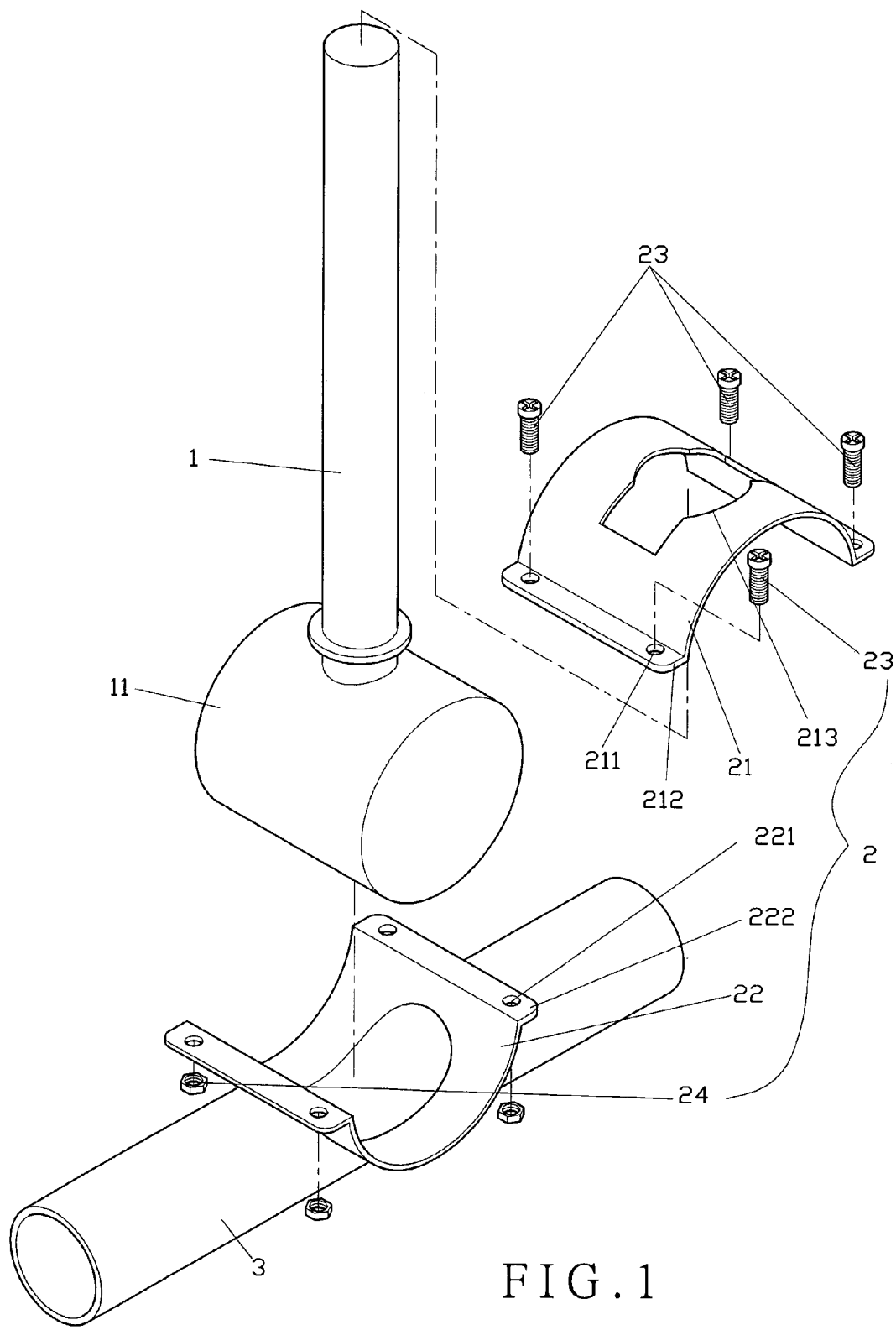
FIG. 1 is an exploded view of the present invention.

As shown in FIG. 1, the present invention comprises a front strut 1, a connecting device 2, and a sleeve 3.

The front strut 1 has a connecting pipe 11 at the bottom thereof.

The connecting device 2 comprises an upper section 21 and a lower section 22. Both the upper section 21 and the lower section 22 are in a semi-circular shape and correspond to each other for wrapping of the connecting pipe 11 therein. Both the upper section 21 and the lower section 22 comprise extending edges 212 and 222 with holes 211 and 221 thereon, respectively. The upper section 21 further comprises a slot 213 on its top for the front strut 1 to insert there through. The lower section 22 is secured on the middle portion of the sleeve 3.

Figure 2:
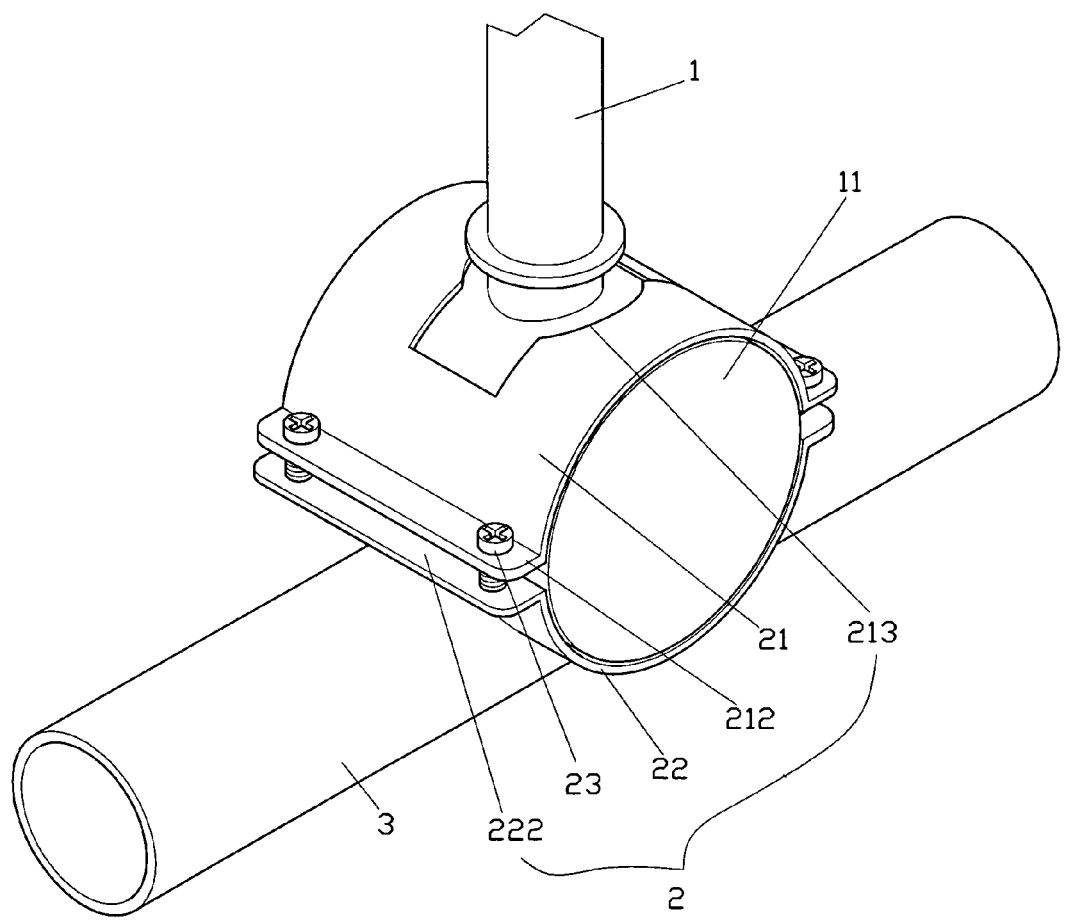
FIG. 2 is a perspective view of the present invention.

To assemble the present invention, as shown in FIG. 2, the front strut 1 is inserted through the slot 213 of the upper section 21, which then seats on the top of the lower section 22 with the holes 211 aligning with the holes 221. The upper section 21 and the lower section 22 are then secured together with bolts 23 and nuts 24. Whereas the connecting pipe 11 is wrapped in the upper section 21 and the lower section 22, which enables the front strut 1 to swing along the slot 213.

The connecting pipe 11 of the front strut 1 can make a movement relative to the connecting device 2 secured on the middle portion of the sleeve 3, so that the front strut 1 can swing relative to the sleeve 3.

Figure 3:
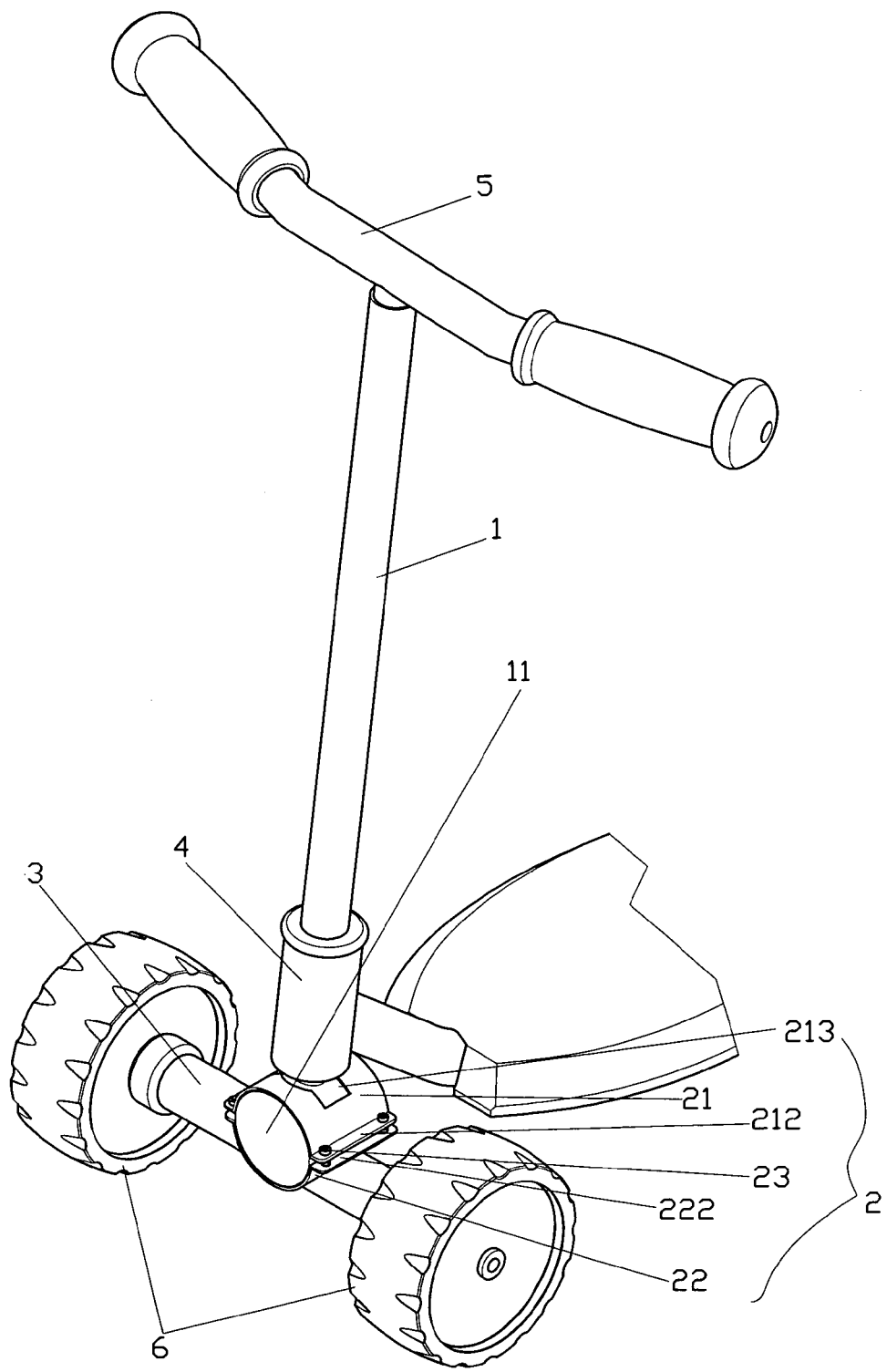
FIG. 3 is a perspective view of a scooter incorporated with the present invention.
Figure 4:
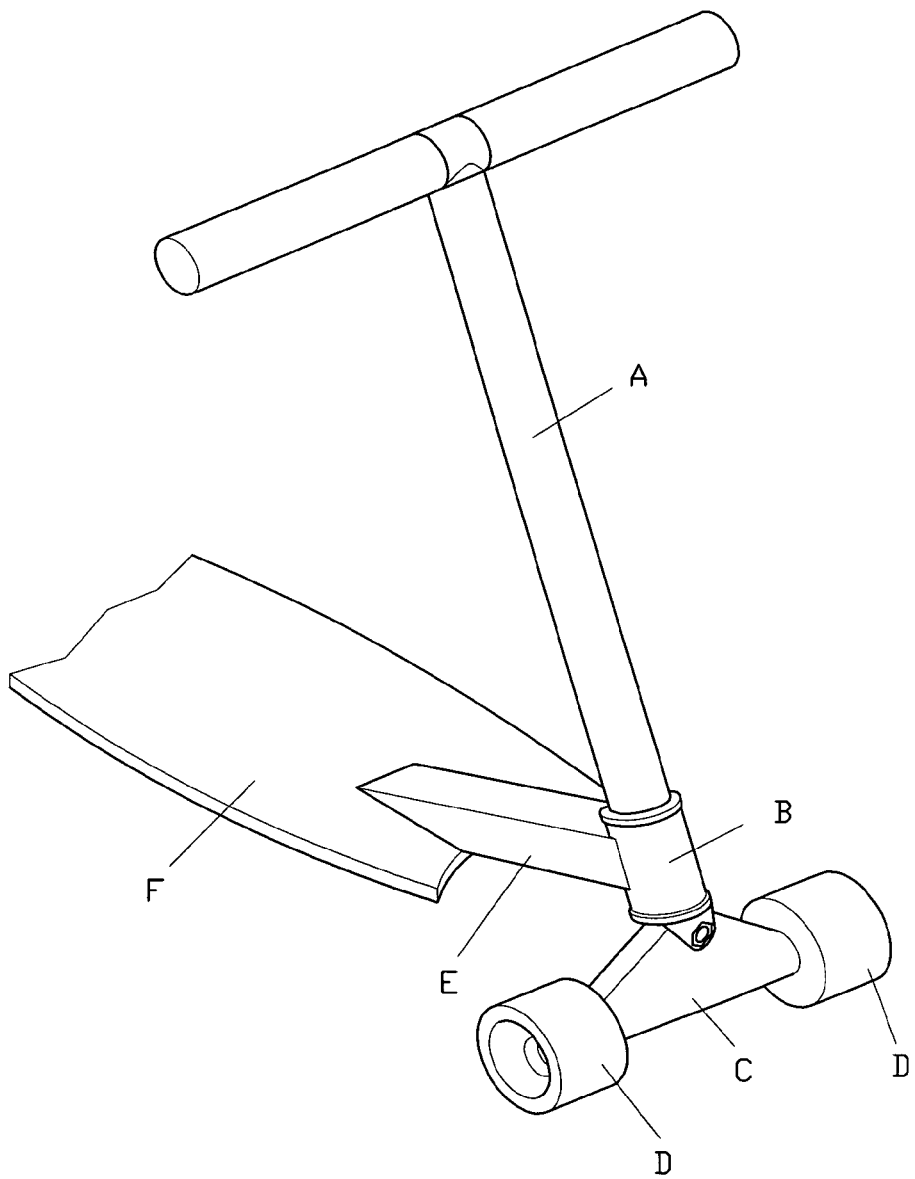
FIG. 4 is a perspective view of a prior art.

To operate the present invention, as shown in FIG. 3, the front strut 1 is inserted through a front pipe 4 and secured thereat, and then connected with a handle 5 at the top. The sleeve 3 has its two ends coupled with two wheels 6. When the scooter rolls forward, the handle 5 links the connecting pipe 11 of the front strut 1 and the sleeve 3 to turn. The handle 5 tilts towards the turning direction, with the two wheels 6 staying on the ground.

The connecting device 2 enclosing the connecting pipe 11 makes the design more solid in use.

I claim:

1. A steering knuckle structure comprising a front strut, a connecting device and a sleeve;

said front strut comprising a substantially cylindrical connecting pipe at a bottom end;

said connecting device comprising an upper section and a lower section, said upper section comprising extending edges with holes thereon, said lower section comprising extending edges with holes thereon, said extending edges and said holes of said upper section corresponding to said extending edges and said holes of said lower section for connection, said upper section further comprising a slot for insertion of said front strut, said lower section being transversely secured on a middle portion of said sleeve, said connecting pipe being wrapped in said upper section and said lower section of said connecting device for rotational displacement therein, said connecting pipe being thereby locked in axial orientation relative to said sleeve.

2. A steering knuckle structure comprising a front strut, a connecting device and a sleeve;

said front strut comprising a substantially cylindrical connecting pipe at a bottom end;

said connecting device comprising first and second sections, each of said first second sections including extending edges with holes thereon, said extending edges and said holes of said first and second sections respectively corresponding one with the other for connection of said first and second sections, one of said first and second sections having formed therein a slot for passage of said front strut therethrough, one of said sections being secured to an intermediate portion of said sleeve, said connecting pipe being retained by said first and second sections of said connecting device for rotational displacement therein, said connecting pipe being thereby locked in axial orientation relative to said sleeve.

* * * * *